Patented Nov. 1, 1949

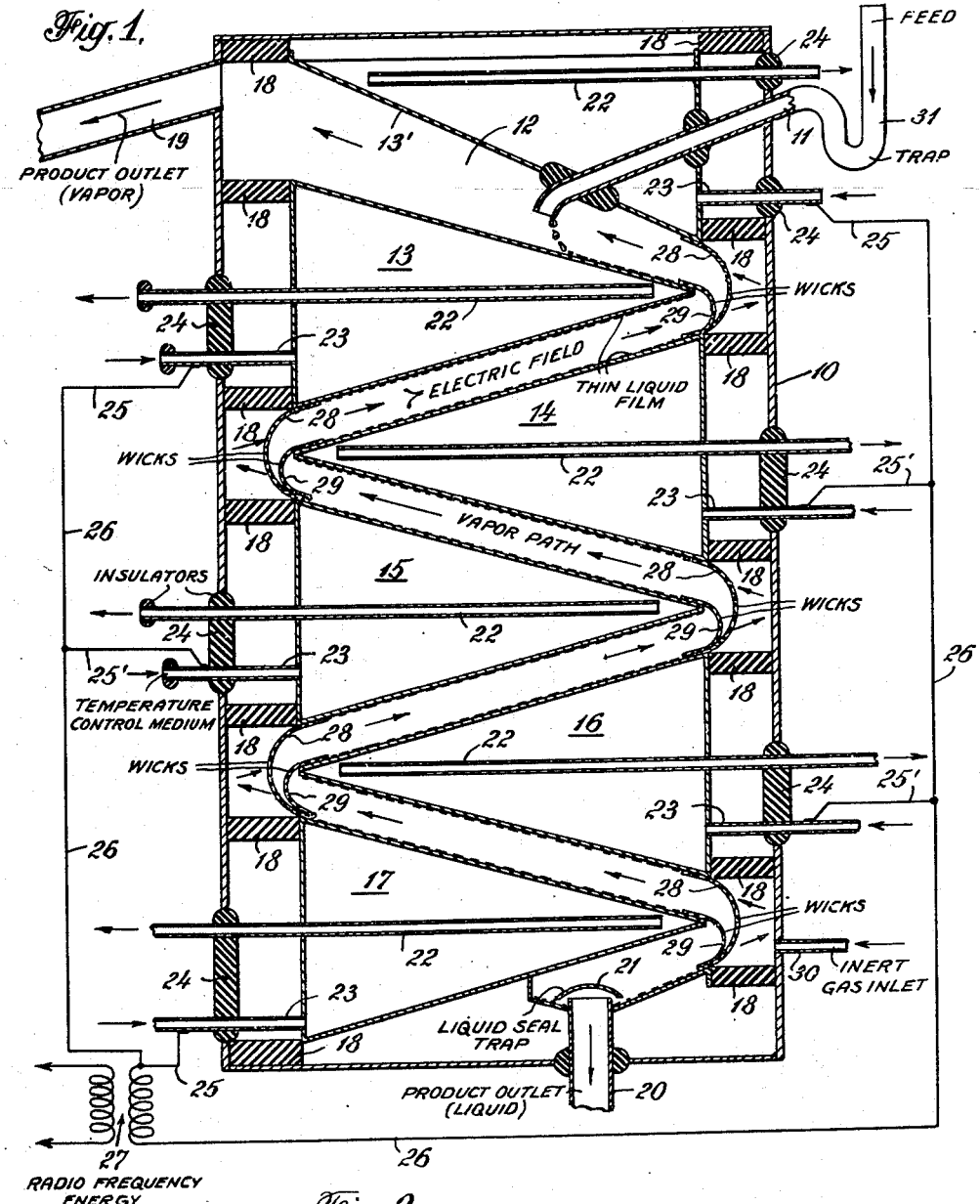

2,486,684

UNITED STATES PATENT OFFICE 2,486,684

DISTILLATION PROCESS USING RADIO-FREQUENCY HEATING

Carleton H. Schlesman, Camden, N. J., and Frank S. Fawcett, Cambridge, Mass., assignors to Socony-Vacuum Oil Company, Incorporated, a corporation of New York Application April 10, 1946, Serial No. 660,896

1 Claim. (Cl. 202—46)

This invention relates generally to the art of fractional distillation and more particularly to a method and apparatus for the separation of compounds having substantially identical boiling points or compounds which form constant boiling mixtures.

Applicants' copending application Serial Number 602,603 (issued as Patent Number 2,455,812, December 7, 1948) describes a superfractionating device and method based on the principle of selective absorption of radiant energy by certain molecules to effect separation from other molecules which do not absorb radiant energy of the particular frequency (wave length) being supplied. The device chosen to accomplish this separation was a modified fractional distillation column which operates by selective condensation.

The present invention also employs the principle of applying radiant energy covering a selected wave length or wave lengths such that molecules of one species in a mixture will absorb energy while those of another species will absorb not at all or to only a small extent. The present invention differs from the preceding one in certain novel aspects, since the separation of molecules, according to the instant invention, is effected by controlled molecular or short path distillation. In the new process a liquid film is maintained at a surface which is carefully controlled with respect to temperature. The vapor above this liquid film is exposed to radiant energy. A cooler condensing surface is provided which is separated from the evaporating surface by a short distance. The apparatus is maintained at a selected pressure suitable to permit a certain rate of transfer of material from the liquid (or solid) surface to the condensing surface. The temperature of the liquid (or solid) is maintained at a suitable value consistent with the pressure used, so that suitable rates of evaporation are obtained. The pressure may be high, 200 to 300 pounds per square inch, if the material is heat stable, or as low as $10^{-6}$ mm. of mercury (high vacuum) for unstable products such as vitamins.

A more complete understanding of the present invention can be gained from the following detailed description when considered with the drawings, in which Figure 1 is a schematic diagram of one system that can be employed to practice the present invention; and Figure 2 is a schematic illustration of the electrical stresses set up across a vapor path by a radio frequency field.

Referring to the drawings in detail, particularly Figure 1, there is shown schematically in vertical section one form of separation unit. The separation unit comprises a housing 10 that is provided with an inlet feed pipe 11, which extends from a point outside the housing 10, at a point near the top thereof, a substantial distance inside the housing and terminates in a serpentine passageway 12 which is defined by a plurality of peculiarly shaped electrodes 13, 14, 15, 16 and 17. All of the electrodes are similarly shaped and are supported in operative position inside the housing 10 by baffles 18 that are formed of electrical insulating material. As shown in Figure 1 of the drawings, each electrode is in the form of a wedge. Adjacent wedge-shaped electrodes point in opposite horizontal directions, those pointing in one direction being secured to the inner wall of the housing 10 on one side by means of the baffles 18 and those pointing in the opposite direction being secured in like manner to the opposite inner wall of the housing 10. The electrodes are positioned one above the other but are spaced one from the other sufficiently far that they will form with the baffles 18 the passageway 12. The passageway 12 terminates at the top of the unit at an outlet pipe 19 and at the bottom of the unit at a second outlet pipe 20. Outlet pipe 19 is supported directly by housing 10. The bottom outlet pipe 20 is supported jointly by the bottom electrode 17 and one of the baffles 18. Outlet 20 is provided with an insulating bushing at the point where is passes through the housing 10. Additionally it is to be noted that outlet 20 is provided with a liquid seal trap 21, the function of which will be described hereafter.

Each of the electrodes 13, 14, 15, 16 and 17 is formed of electrically conductive material so selected that it will withstand the operating temperatures and pressures encountered in the operation of the unit.

The hollow space inside each electrode is adapted to be supplied with a temperature control medium that is supplied from a source, not shown, located outside the housing through the conduits 22 and 23. Conduits 22 and 23 are shown provided with common electrical insulating bushings 24, where they pass through the housing 10. The insulating bushings 24 are provided so that one or both of the conduits 22 or 23 can be used as electrical conductors by means of which an electrical potential can be placed on the electrodes 12-17, inclusive. The conduits 22 and 23 are shown electrically connected in pairs to the electrodes. Electrode 23 of each pair is connected through conductors 25 to bus lines 26 which are in turn connected to a source of potential, shown in Figure 1 of the drawings as the secondary winding of transformer 27.

The wicks 28 and 29 are provided to direct the fluid flowing on adjacent electrode surfaces in a desired path.

In addition to the feed inlet 11 there is provided at a point near the bottom of the unit a second inlet 30. The purpose of this inlet is to admit an inert gas which serves to sweep vapors formed in the serpentine passageway 12 upwardly and ultimately out through the outlet 19.

The form of the present invention described in detail above is placed in condition for operation by applying radio frequency potentials to the electrodes 13–17, inclusive. It is to be noted that the electrodes are so connected that adjacent electrodes have instantaneous potentials on them of opposite polarity. In this manner strong electric fields, alternating at the frequency of the source of potential, are set up across the serpentine passageway 12 between adjacent electrodes. The temperature control medium is circulated through each electrode by means of the conduits 22 and 23 to bring the surfaces of the electrodes to the desired temperature.

Gradients of temperature are maintained between adjacent electrodes. Electrode 17 is maintained at a higher temperature than electrode 16; electrode 16 at a higher temperature than electrode 15; electrode 15 at a higher temperature than electrode 14; and electrode 14 at a higher temperature than electrode 13. The condensing surface 13', opposite the top surface of electrode 13, is also maintained at a controlled temperature.

In practice, the operation may be carried out in several ways, one of which will be described with reference to Figure 1.

The mixture containing, for example, two components A and B in liquid phase is fed into the unit through the feed pipe 11. The liquid flows from pipe 11 onto the top surface of electrode 13 where it forms a thin liquid film. The top surface of each electrode functions as a vaporizing surface and the bottom of each electrode forms a condensing surface. The liquid flows from one vaporizing surface to the next, guided by the wicks 29, from top to bottom of the unit. As the liquid flows along the top surface of each electrode it passes through fields of electric stress. The stress field is a high (radio) frequency field, the frequency of which is so selected that one component of the mixture will absorb appreciable energy at that frequency while the other component will only weakly absorb energy at the selected frequency.

Without the application of an electrical field molecules or atoms in the film of liquid, comprising components A and B, at a temperature $T_0$ there will be a certain tendency for each to escape to the adjacent condensing surface which is maintained at a temperature $T_c$. This tendency is dependent upon the molecular or atomic weights of the two components; the initial concentration; the temperature $T_0$; the pressure $P$; other characteristics of the apparatus; and their energy content or effective vapor pressure. For a mixture of given molar or atomic ratio of component A to component B at a fixed temperature $T_0$, pressure $P$, and distance $d$ between vaporizing surface and condensing surface in a given apparatus there will be a rate of transfer from film to condensing surface of molecules or atoms of type A, equal to $R_a$ and a rate of transfer of type B equal to $R_b$ which will be primarily a function of molecular or atomic weights $M_a + M_b$ according to Langmuir's equation:

$$N = \frac{KP}{\sqrt{\frac{M}{T}}} \text{ gms./sec./cm.}^2$$

where $P$ is the vapor pressure; $M$ is the molecular weight; and $T$ is the absolute temperature. This is the condition when no radiant energy is supplied.

When the principle of selective absorption of specific radiant energy is applied let it be assumed that the molecular or atomic species are of equal molecular weight, i. e., $M_a = M_b$. The relative magnitude of $R_a$ and $R_b$ then will depend on the nature and molar or atomic ratio of the components in the original mixture with the other factors constant as above and no radiant energy supplied. However, when suitable radiant energy is supplied, as illustrated in Figure 2, such that species A absorbs appreciably while species B does not absorb appreciably, then there is developed a difference in energy content between A and B where A molecules or atoms which have absorbed radiant energy possess on the average increased energy over B molecules or atoms. This situation will persist only for a short time due to the collisions between the various molecules whereby the energy is redistributed. Thus, the molecules or atoms of increased energy of species A have an increased tendency to escape. If a suitable combination of vaporizing temperature $T_0$, condensing temperature $T_c$, pressure $P$ and apparatus characteristics are chosen then the rate of transfer of A, $R_a$ relative to the rate of transfer of B, $R_b$, will be increased. This accomplishes an enhancement of separation above that obtained without the special radiant energy being supplied.

The inert gas admitted to the unit through inlet pipe 30 flows countercurrent to the liquid and continually sweeps the vapor product enriched in component A out through the outlet 19. The liquid flowing from the outlet 20 will be enriched in component B. This liquid also serves to seal trap 21 so that the inert gas will not escape. Feed pipe 11 is also provided with a trap 31 to prevent the escape of the inert gas. It is obvious that further purification of the components can be had by separately recycling the products.

In the cases where $M_a$ and $M_b$ are not equal then the present effect will be superimposed upon the original tendencies $R_a$ and $R_b$. By proper choice of the characteristics of the radiant energy a disturbance of the original molar or atomic ratios may be accomplished which amounts to a separation to a greater or lesser degree. The effect is then amplified by successive operations on the condensate.

This method of separation is particularly advantageous in dealing with complex products, such as for example in the extraction of vitamins from natural products. Molecular high-vacuum stills employing short-path distillation effects are already in use. The addition of the selective radiation principle greatly improves the efficiency of such separations.

The process may be employed equally well with simpler products. For example, nitro chlorobenzene has a boiling point of 235° F. and hence would be difficult to distill from a mixture of it and di-chlorobenzaldehyde which has a boiling point of 231° F. These materials have very different absorption curves in the radiant energy spectrum. Advantage may be taken of this characteristic to effect separation in the type of unit described above.

Other forms of radiant energy may be used. For example, infra-red energy may be employed in a similar manner for the separation of a mixture of 2,2-dimethylpentane having a boiling point of 79.2° C. and 2,2,3-trimethylbutane (triptane) which has a boiling point of 80.9° C. The 2,2-dimethylpentane absorbs strongly infra-red radiation of 13.51 microns wave length while triptane shows no appreciable absorption in this region.

We claim:

A method of separating chemical substances having substantially the same boiling point that comprises the steps of vaporizing the mixture in an electrical stress field alternating at a radio frequency so selected that one component of the mixture will absorb energy at that frequency and the other component will not, condensing the vapors of the component that does not absorb energy at that frequency in the electrical stress field, withdrawing as a vapor the second component which absorbs radiant energy by sweeping the uncondensed component out of the field with an inert gas.

CARLETON H. SCHLESMAN.
FRANK S. FAWCETT.

REFERENCES CITED

The following references are of record in the file of this patent:

UNITED STATES PATENTS

| Number | Name | Date |
| --- | --- | --- |
| 1,056,043 | Morrison | Mar. 18, 1913 |
| 1,191,916 | Brooks et al. | July 18, 1918 |
| 1,372,477 | Bodman | Mar. 22, 1921 |
| 1,385,660 | Bodman | July 26, 1921 |
| 1,419,008 | Baum | June 6, 1922 |
| 1,881,041 | Benjamin | Oct. 4, 1932 |
| 1,950,830 | Van Dijck | Mar. 13, 1934 |
| 2,073,327 | Vigers | Mar. 9, 1937 |
| 2,106,782 | Whittiere | Feb. 1, 1938 |
| 2,128,223 | Fraser | Aug. 30, 1938 |
| 2,153,599 | Thomas | Apr. 11, 1939 |
| 2,167,395 | Thomas | July 25, 1939 |
| 2,249,526 | Hickman | July 15, 1941 |
| 2,265,762 | McKittrich et al. | Dec. 9, 1941 |
| 2,343,666 | Hickman | Mar. 7, 1944 |
| 2,362,889 | Darrah | Nov. 14, 1944 |
| 2,387,595 | Luth | Oct. 23, 1945 |

FOREIGN PATENTS

| Number | Country | Date |
| --- | --- | --- |
| 163,363 | Great Britain | May 18, 1921 |
| 191,547 | Great Britain | Jan. 18, 1923 |
| 690,342 | France | Feb. 20, 1930 |